United States Patent [19]

Weiss

[11] Patent Number: 4,683,374

[45] Date of Patent: Jul. 28, 1987

[54] METHOD AND MEANS FOR MULTIPLEXING OPTICAL SENSORS

[75] Inventor: Edward L. Weiss, Milford Township, Pike County, Pa.

[73] Assignee: General Signal Corporation, Stamford, Conn.

[21] Appl. No.: 763,156

[22] Filed: Aug. 7, 1985

[51] Int. Cl.[4] .......................... G02F 1/00; G02F 2/00
[52] U.S. Cl. .................................. 250/227; 455/612
[58] Field of Search ........................ 250/227, 578; 340/365 P; 370/3, 4; 455/612; 350/96.15, 96.29

[56] References Cited

U.S. PATENT DOCUMENTS 4,529,875 7/1985 Brogardh et al. ............... 250/227
4,560,868 12/1985 Brogardh et al. ............... 250/227

Primary Examiner—David C. Nelms
Assistant Examiner—S. Allen
Attorney, Agent, or Firm—Harold Huberfeld; William G. Miller, Jr.

[57] ABSTRACT

Apparatus for optically multiplexing the signals of several optical sensors when those sensors are of the type which utilize a single light input optical fiber for each sensor to send light to the sensor from a central monitoring station and a single signal output optical fiber for each sensor to communicate the light output of the sensor back to a single receiver in a central monitoring station. There is provided means which will sequentially introduce a predetermined amount of light flux into the sensors and thereby produce signal outputs from those sensors indicative of the magnitude of the quantities being measured. There is also provided means to communicate those outputs to a single common optical receiver.

3 Claims, 1 Drawing Figure

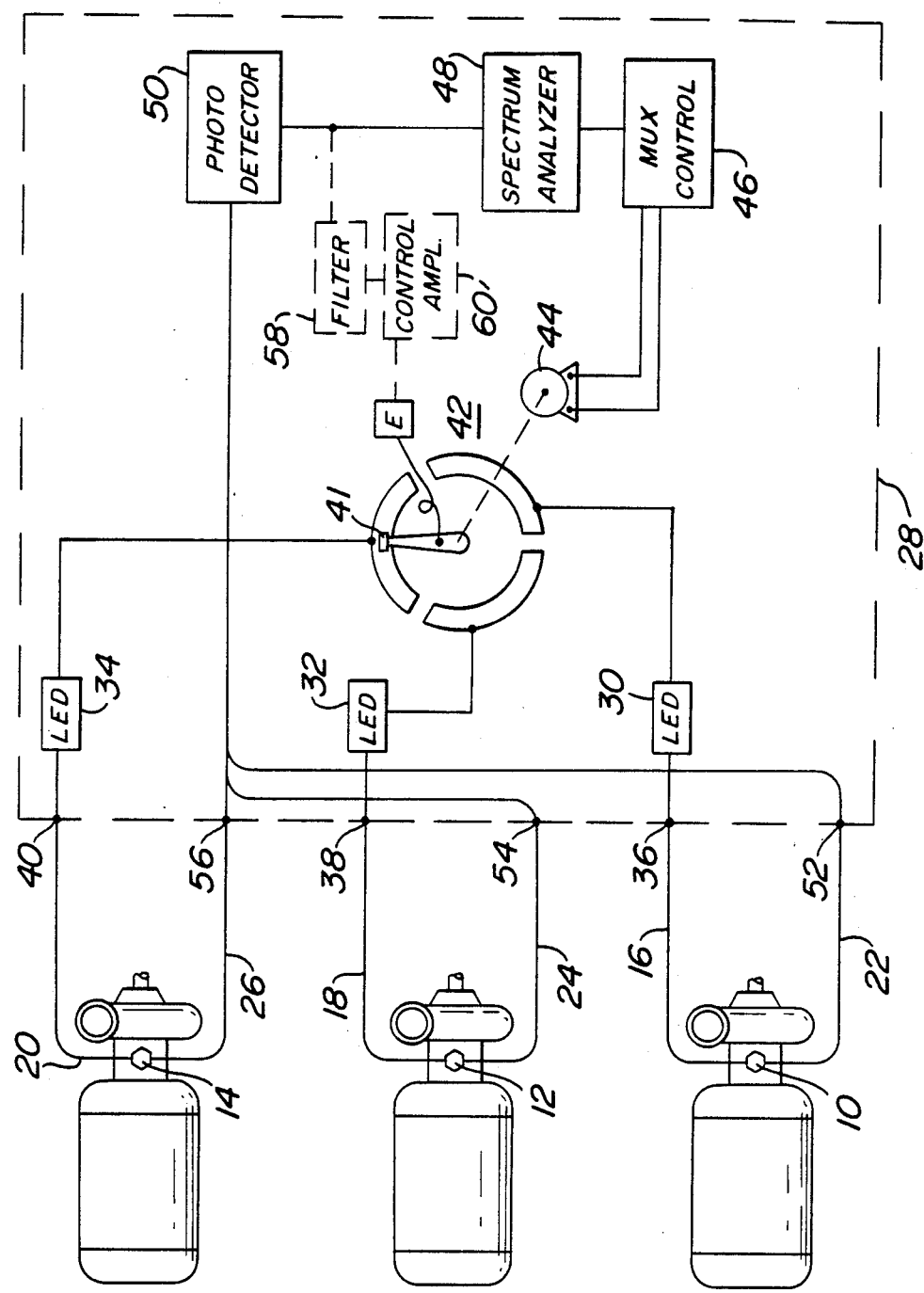

METHOD AND MEANS FOR MULTIPLEXING OPTICAL SENSORS

BACKGROUND OF THE INVENTION

The present invention relates to a method and means for multiplexing signals from several optical sensors into a single signal receiver for subsequent processing. More particularly, this invention relates to a method and means for multiplexing signals from optical sensors which have their own light input optical fibers leading to the sensor, for carrying light, as well as their own signal output optical fibers leading away from the sensors, for carrying the output signal of the sensors.

In many industrial measurement applications there exists ambient conditions which make the ordinary electrical measurements using electrical sensors difficult or impossible. Such conditions include the presence of large electrical fields, which create noise pick-up in the electrical circuits normally connecting electrical sensors to centrallized instrumentation typical of idustrial applications. In order to overcome such pick-up problems optical sensors and optical communications are being used more frequently. These optical elements are immune to electrical pick-up and other troublesome ambient conditions.

In the industrial application of optical sensors it is frequently necessary to use large numbers of sensors; and, therefore, the instrumentation becomes expensive unless multiplexing of the sensor signals can be accomplished in a way which is inexpensive. Normally, when using electrical sensors, the multiplexing of the several sensor output signals to a common receiver which detects that output for further processing is an inexpensive approach. However, the multiplexing of optical signals has been difficult and expensive because of the inherent difficulties of commutating optical fibers in a manner similar to the commutating of electrical circuits.

It is an object of this invention to provide a method and means for commutating optical sensor signals without the need to commutate the fibers themselves.

SUMMARY OF THE INVENTION

Apparatus is provided to carry out a novel method for multiplexing the signals of several optical sensors, when those sensors are of the type which utilize a single light input optical fiber for each sensor, to send light to the sensor from a central monitoring station, and a single signal output optical fiber for each sensor, to communicate the light output of the sensor back to a single receiver in a central monitoring station. To this end there is provided means which will sequentially introduce a predetermined amount of light flux into selected ones of the light input optical fibers to activate the associated sensors and thereby produce signal outputs from those sensors indicative of the magnitude of the quantities being measured. There is also provided means to communicate those outputs to a single common optical receiver.

BRIEF DESCRIPTION OF THE DRAWINGS

The single drawing shows a circuit diagram of a multiplexer for a plurality of optical sensors, such as photoelastic accelerometers, as they might be applied to monitoring the vibration of rotating machinery. Those elements shown in dashed form are an addition which can be added when control of light intensity is desired.

DESCRIPTION OF THE PREFERRED EMBODIMENT

In the sole figure, there is shown three centrifigul pumps which are driven by electrical motors. If it is desired to monitor shaft vibration in these units, optical accelerometers 10, 12, and 14 can be mounted on the units in positions such as shown in the figure.

Each of the respective sensors 10, 12, and 14 are shown as having a light input optical fiber, such as the fibers 16, 18, and 20, respectively. Also, each of the sensors has its' own signal output optical fiber, such as fibers 22, 24, and 26, respectively. The input optical fibers carry light from a source to the individual sensors and the output fibers carry the output signals from the sensors to a central monitoring station 28.

The monitoring station 28 has a set of light emitting diodes (LED's) 30, 32, and 34, one for each of the sensors. Those LED's are connected to the individual source power output ports of the monitoring station, 36, 38, and 40, respectively. The light input optical fibers of the sensors are each connected to one of the output ports so that light from the LED's can be introduced into the sensors, one at a time, when an individual LED is energized by connection to a power source. Such a source may, for example, be the source E, which is shown connected to the rotating commutator brush 41 of the commutator switch 42 so that the LED's can be sequentially energized as the motor 44 operates to rotate the commutator brush so it contacts the individual segments of the commutator.

The sequence of the connection of the LED's can be in accordance with a fixed sequence; or, as by the use of digital techniques, it can be in accordance with a sequence which is determined by conditions, such as the particular magnitude of some of the measurements being made. Thus, the sequence can be modified to monitor more frequently those sensors which show indications which exceed predetermined limit values, for example. The intelligence for providing such a modification of sequence would reside in the Mux control 46, which, in turn, can respond to the measurements made by the spectrum analyzer 48, in response to the output of the receiver 50. The receiver 50 can advantageously be a photodetector, such as a photodiode.

As is shown in the drawing, the sensor signal output optical fibers 22, 24, and 26 are connected to the signal input ports 52, 54, and 56 of the monitoring station 28. The input ports are then connected to the receiver 50 by optical fiber which are arranged to join at a common connection to the receiver. This common connection can be brought about by connecting the fibers to a single fiber which is then introduced into the photo detector, or a number of fibers can be fed to a single photodiode. For example, an arrangement forming a square array could have 13×13 fibers, i.e. 169 channels, if one has a photodiode with a 2.0 mm square receiver and uses 140 micron fiber. This can be done by removing the buffer coating from the fiber ends so that the fibers may be close coupled to the receiver.

In an analog system, such as shown in the figure, the intensity of the light source can be controlled by a control circuit responding to variations in the output from the sensors. For example, in monitoring vibration by the use of photoelastic sensors with a vibration spectrum analyzer, one can use the fact that the output signal of such sensors consists of an AC signal with a fixed DC component by controlling the intensity of the sources to maintain the average received level to a selected value. The circuit additions necessary in the figure to accomplish such control is shown in dashed form. These additions include a low pass filter 58 which receives the output of the photodetector 50 and passes the low frequency component and hence the DC portion of the signal. That DC level provides an input to a control amplifier 60 which in turn is connected to the power source E which in this case is a controllable source for modifying the power input to the light sources 30, 32, and 34 to standardize their output. For systems which have no DC offset, a separate monitor photodiode may be provided for each light source so as to permit controlling the output of each source to be equal to an intially determined level corresponding with a full scale signal. With digital systems, of course, the absolute intensity of the light signal is relatively unimportant.

The arrangement of the figure shows one system for carrying out the invention. Other systems can be used to carry out the method of this invention. As an example, the commutator 42 could be replaced with a digital circuit which could be addressed to select whatever commutation sequence is desired.

It will be evident, of course, that the spectrum analyzer and the Mux control can be connected to a data bus interface when it is desirable to use the data obtained from the measurements in a more complex system of data reduction.

What is claimed is:

1. A method for multiplexing the signals of several optical sensors of the type which utilize a single light input optical fiber for each sensor to send light to said sensors from a central monitoring station and a single signal output optical fiber for each sensor to communicate the light output of the sensors back to a single receiver in said monitoring station, which comprises the step of:

sequentially introducing a predetermined amount of light flux into selected ones of said light input optical fibers to activate the associated sensors to produce signal outputs indicative of the magnitude of the quantities being measured for communication to said receiver.

2. A multiplexer for a plurality of optical sensors of the type which have a single light input optical fiber for each sensor to send light to said sensors and a single signal output optical fiber for each sensor, which comprises:

a separate source power output port for connection to the light input optical fibers of each sensor;

a separate input port for connection to the signal output optical fibers of each sensor;

a single receiver coupled in common to all of said input ports, said receiver operating to convert light flux signals from said sensors to corresponding electrical signals representative of the magnitudes of the light flux; and means for sequentially introducing a predetermined amount of light flux into selected ones of said light input optical fibers through said source power output ports to activate the associated sensors to produce output signals indicative of the magnitude of the quantities being measured by said sensors for communication to said receiver by way of said signal input ports.

3. A multiplexer for a plurality of optical sensors of the type which have a single light input optical fiber for each sensor to send light to said sensors and a single signal output optical fiber for each sensor to carry light from said sensors, which comprises:

a source power output port for each sensor;

a separate light source coupled to each of said output ports;

a signal input port for each sensor;

a single receiver coupled in common to all of said signal input ports, said receiver being responsive to light signals to produce a corresponding electrical signal; and means for energizing said light sources selectively in sequence so as to detect the output of the selected sensors in the sequence desired without requiring a plurality of receivers.

* * * * *